Jan. 16, 1934.  R. L. WAGNER  1,944,047
WELDING TORCH
Filed Dec. 12, 1928
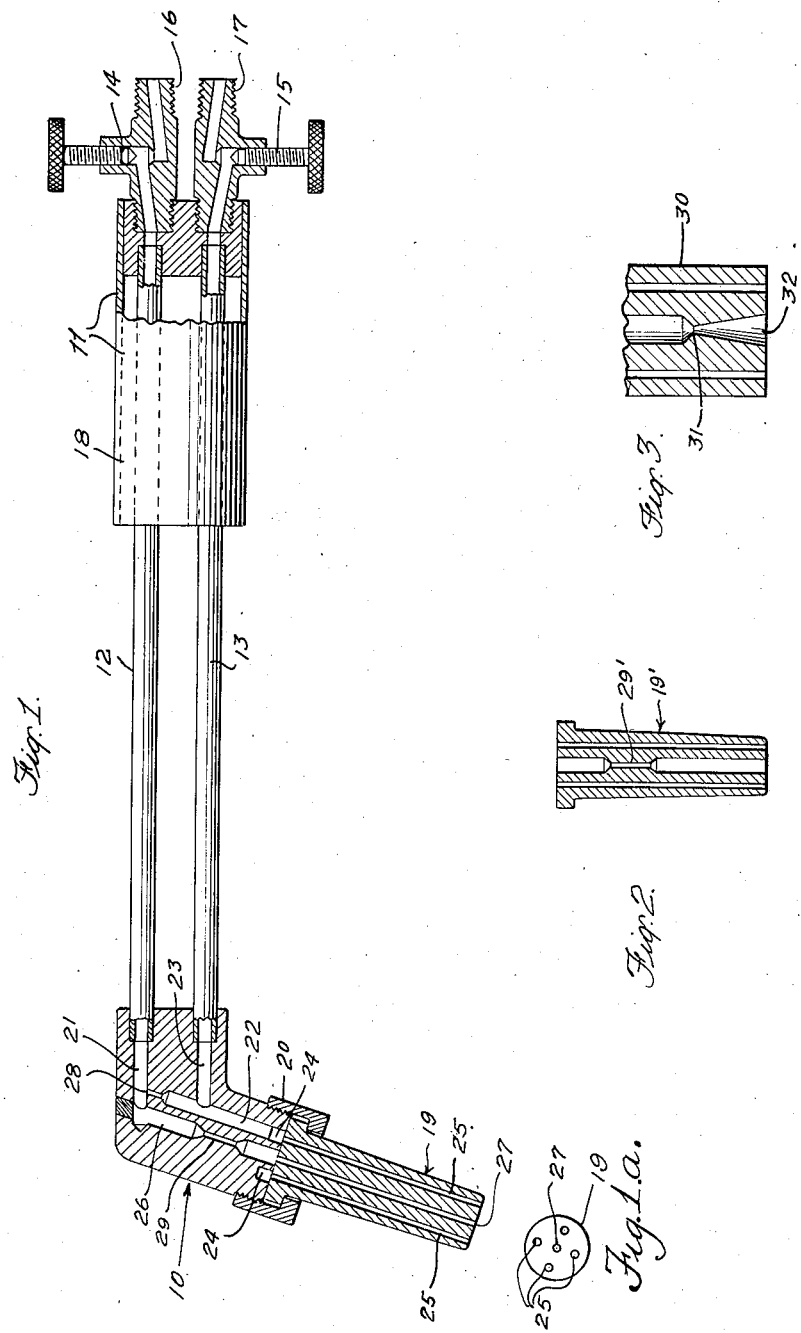

Patented Jan. 16, 1934

1,944,047

UNITED STATES PATENT OFFICE 1,944,047

WELDING TORCH

Robert L. Wagner, Chatham, N. J., assignor to Oxweld Acetylene Company, a corporation of West Virginia Application December 12, 1928
Serial No. 325,506

18 Claims. (Cl. 158—27.4)

This invention relates to welding torches and more particularly to a means for using auxiliary oxygen in connection with the flames formed by such torches.

In the welding torches known heretofore, oxygen and a fuel gas are mixed within a torch to form a combustible mixture that is discharged from the torch and burned to form a welding flame. When the oxygen is commercially pure and the combustible fluid is acetylene gas they are combined in substantially equal proportions as it has been found that a substantial excess of either in the mixture has an injurious effect on certain metals when the flame is used for fusion welding.

It is well known in that art that when a welding flame is formed by the combustion of a hydrocarbon such as acetylene in the presence of oxygen and that the flame burns in two stages which, for the purpose of identification, may be called the primary stage and the secondary stage. In the primary stage the burning of the combustible mixture formed in the welding torch produces hydrogen and carbon monoxide. In the secondary stage the hydrogen and carbon monoxide combine with the oxygen of the air and produce carbon dioxide and water vapor. The rate of combustion in the secondary stage is slower than that in the primary stage and much of the heat of the secondary stage is wasted because the oxygen of the air combines with the products of combustion formed in the primary stage so slowly that much of them pass the portion of the metal being welded before they burn.

It has also been shown by S. W. Miller in his patent application bearing Serial Number 278,024 and filed May 15, 1928 (Patent No. 1,891,314 issued December 20, 1932) that when auxiliary oxygen, such as the commercially pure oxygen used in welding operations, is introduced into the vicinity of the welding flame at or near the end of the torch tip that this auxiliary oxygen combined with the products of combustion of the primary stage sooner than when oxygen is drawn from the air only so that the secondary combustion partially occurs close to the zone of the primary combustion. Thus much of the heat of the combustion in the secondary stage is concentrated upon the area of the metal being welded thereby increasing the welding speed and decreasing the amount of gas used.

If more than a certain amount of auxiliary oxygen is used in the welding flame it will have an injurious effect upon some metals. Heretofore, it has been necessary for a torch operator to manually control the amount of auxiliary oxygen used and it is difficult for him to determine while he is making the weld whether or not enough auxiliary oxygen is being used to injure the metal. Therefore, one of the objects of this invention is a means for introducing auxiliary oxygen into the vicinity of a welding flame. Another object is a means for automatically controlling the volume of this auxiliary oxygen. Another object is a means for reducing the velocity of the auxiliary oxygen at its point of introduction into the vicinity of the welding flame. Other aims and objects will be apparent from the following description and illustration of the invention.

The apparatus with which I attain these objects is illustrated in the accompanying drawing, in which:

Fig. 1 is a longitudinal section of a welding torch showing a means for injecting auxiliary oxygen into a welding flame and a means for automatically controlling the volume of the auxiliary oxygen. Fig. 1a is a plan view of the discharge end of the nozzle.

Fig. 2 is a longitudinal section of a welding torch tip adapted for use with the torch shown in Fig. 1, and showing a means within the tip for automatically controlling the volume of auxiliary oxygen, and, Fig. 3 is an enlarged longitudinal section of the outer end of a torch tip adapted for use with the torch shown in Fig. 1, and showing a means for reducing the speed at which the auxiliary oxygen is injected into the welding flame.

The welding torch shown in the illustration is composed of a head 10 and a body 11 which are connected by two tubes or pipes 12 and 13. The tubes 12 and 13 may be secured to the head 10 and the body 11 in any conventional manner such as by inserting the ends of the tubes into sockets provided in the head and body and then sealing the joints with solder. Threaded to the rear of the body 11 are two manually operable valves 14 and 15 for controlling the volume of the oxygen and acetylene respectively. Upon the rear end of the valve 14 is a threaded portion 16 adapted to be coupled to a flexible hose such as commonly used to convey oxygen from the source of supply to the welding torch. For best results I prefer to use commercially pure oxygen such as that usually compressed into cylinders and used for oxy-acetylene welding and cutting operations, and to distinguish this comparatively pure oxygen from the oxygen of the air I choose to term it oxygen concentrate. Upon the rear end of the valve 15 is a threaded portion 17 adapted to be coupled to a flexible hose such as commonly used to convey the combustible gas from the source of supply to the welding torch. Any hydrocarbon gas may be used to form the welding flame but for best results I prefer that known as acetylene, and it may be generated near the welding torch and conveyed from the generator directly to the torch, or it may be compressed into cylinders which are connected to the welding torch in the usual manner. Attached to the body 11, surrounding it and the tubes 12 and 13, and extending part way from the body to the head 10 is a tube or pipe 18 that serves as a handle for holding the torch while it is in use.

The torch head 10 is preferably a casting of a metal such as brass or bronze, extending a short distance forward from the point where it joins the tubes 12 and 13 and then extending downward to a point where it is detachably coupled to a torch tip 19 by a gland nut 20 that is threaded to the head 10.

When the torch is in operation the acetylene passes through the valve 15, and the tube 13 to the head 10, and the oxygen passes through the valve 14, and tube 12 to the head 10. The volume of oxygen is controlled by the valve 14, and the volume of acetylene by the valve 15. The oxygen enters the head 10 through the passage or conduit 21 and then it divides; one part flowing down the passage or conduit 22 where it is joined by the acetylene entering through the passage 23, thereby forming a combustible mixture which passes on down through the passage 22 to the distributing chamber 24, where it is distributed to the four tip passages or conduits 25 which conduct it out of the tip where it burns forming the welding flames. The other part of the oxygen termed auxiliary oxygen, flows down the passage or conduit 26 in the head 10, and the passage or conduit 27 in the tip 19, where it is ejected near the welding flame. A constriction or reduced portion 28 operating as a metering orifice in the upper part of the passage 22 controls the relative amount of oxygen going into the combustible mixture, and a constriction or reduced portion 29 operating as a metering orifice in the passage 26 controls the relative amount of oxygen that is introduced near the flame as auxiliary oxygen. The amount of auxiliary oxygen that may be used is dependent upon the amount of combustible gases formed in the primary stage and therefore upon the size of the flame and the amount of oxygen and acetylene used in the combustible mixture that forms the flame. The size of the flame is controlled in the usual manner by admitting more or less oxygen and acetylene through the control valves 14 and 15, and the correct amount of each is determined by the appearance of the flame in the usual way. When a small flame is formed by admitting less oxygen and acetylene a smaller amount of oxygen passes through both of the constrictions 28 and 29 and consequently less auxiliary oxygen is ejected near the flame. When a large flame is formed by admitting more oxygen and acetylene more oxygen passes the constrictions 28 and 29 and consequently more auxiliary oxygen is introduced at the flame. Thus the relative sizes of the constrictions 28 and 29 automatically regulate the volume of auxiliary oxygen in proportion to the amount used in the combustible mixture, and, therefore, to the size of the flame.

When a single welding torch is used for making different sized welds it may be desirable to employ a flame either larger or smaller than that which a particular tip is capable of forming. The constriction 29 in the head 10 of Fig. 1 will usually be of one size, and therefore cannot be suitable for the best results with different size tips which are necessary to produce different size flames. By placing the constriction in the tip 19' as shown at 29' in Fig. 2, instead of in the torch head as shown at 29, the size of the constriction 29' in each tip can be made to suit the various size flames produced in ordinary welding practice with that tip.

The combustible mixture is ejected from the torch tip 19 through the open ends of the four gas passages 25 which are arranged in a circle so that the flame is substantially annular in form and hollow as it leaves the torch. The auxiliary oxygen is injected into this hollow portion of the flame and it has been found that under some conditions the auxiliary oxygen combines more readily with the products of combustion formed in the primary stage when the auxiliary oxygen is ejected from the tip at a comparatively slow rate of speed. One method of accomplishing this result is by placing the constriction 31 controlling the amount of auxiliary oxygen, near the outer end of a torch tip 30 as shown in Fig. 3, and then gradually enlarging the auxiliary oxygen passage from the constriction to the outer end of the tip as shown at 32. Thus the volume of auxiliary oxygen is controlled by the tip through which the flame forming gases pass, and by enlarging the size of the auxiliary oxygen orifice 32 more or less the speed at which the auxiliary oxygen is emitted may be controlled so it is correct for the flame formed by each tip.

The combustion in the secondary stage is stimulated because the products of combustion formed in the primary stage combine with the auxiliary oxygen sooner than when no auxiliary oxygen is used and they must combine only with the oxygen of the air. Under some conditions auxiliary oxygen may be introduced at the outside of a welding flame but better results have been secured when it was introduced at the center of a hollow flame and therefore this method of introducing auxiliary oxygen is preferred although others may be used.

As has been stated before, part of the combustible gases burn before they pass the weld and part burn after they pass the weld. The part that burns before passing the weld produces useful welding heat. The part that burns after passing the weld is mostly wasted. Therefore, better results and greater economy are obtained by burning a larger part of the combustible gases before they pass the weld. When too much oxygen is used in the combustible mixture it reduces the temperature of the flame so the combustible gases burn more slowly and more of them pass the weld before burning. When auxiliary oxygen is introduced near the flame the action is different because the flame temperature is not reduced and the auxiliary oxygen combines with the products of combustion formed in the primary stages before they reach the weld so more of the combustible gases are burned before they pass the weld, and this increases the amount of heat in the flame at the weld and decreases the amount that is wasted beyond the weld. Thus greater economy and welding speed are obtained.

I claim:

1. In a welding torch, the combination with means for combining a hydrocarbon and an oxygen concentrate to form a welding flame having a hollow therein, of means for injecting an auxiliary stream of oxygen concentrate into the hollow of said welding flame, means for automatically controlling the volume of the stream of auxiliary oxygen, and means for reducing the speed at which the stream of auxiliary oxygen is injected into the welding flame.

2. In a welding torch, the combination with means for combining a hydrocarbon and an oxygen concentrate to form a welding flame, of means for adding an auxiliary stream of oxygen concentrate to the welding flame, means for automatically controlling the volume of the stream of auxiliary oxygen, and means including an enlarged orifice for reducing the speed at which the stream of auxiliary oxygen is injected into the welding flame.

3. In a welding torch, the combination with means for combining a hydrocarbon and an oxygen concentrate to form a welding flame, of means for injecting an auxiliary stream of oxygen concentrate into the welding flame, and means for reducing the speed at which the stream of auxiliary oxygen is injected into the welding flame.

4. In a welding torch, the combination with means for combining a hydrocarbon and an oxygen concentrate to form a welding flame, and a tip removably attached to said torch, of means including an auxiliary passage through said tip for adding an auxiliary stream of oxygen concentrate to the inner portion only of the welding flame, and means for automatically controlling the volume of the stream of auxiliary oxygen.

5. In a welding torch, the combination with means for combining a hydrocarbon and an oxygen concentrate to form a welding flame having a hollow therein, and a tip removably attached to said torch, of means including an auxiliary passage extending through said tip for ejecting an auxiliary stream of oxygen concentrate into said hollow, and means including a constriction in said auxiliary passage for automatically controlling the volume of the stream of auxiliary oxygen.

6. In a welding torch, the combination with means for combining a hydrocarbon and an oxygen concentrate to form a welding flame, and a tip removably attached to said torch, of means including an auxiliary passage extending through said tip for adding a stream of auxiliary oxygen concentrate to the welding flame, means including a constriction in said auxiliary passage for automatically controlling the volume of the stream of auxiliary oxygen, and means for reducing the speed at which the stream of auxiliary oxygen is ejected from said tip.

7. In a welding torch, the combination with means for combining a hydrocarbon and an oxygen concentrate to form a welding flame, and a tip removably attached to said torch, of means including an auxiliary passage extending through said tip for ejecting a stream of auxiliary oxygen concentrate near the welding flame, means including a constriction in said auxiliary passage for automatically controlling the volume of the stream of auxiliary oxygen, and means including an enlargement of the outer end of said auxiliary passage for reducing the speed at which the stream of auxiliary oxygen is ejected.

8. In a welding torch, the combination with means for combining a hydrocarbon and an oxygen concentrate to form a welding flame, means for varying the volume of hydrocarbon in the welding flame, and means for varying the volume of oxygen in the welding flame, of means for adding an auxiliary stream of oxygen concentrate to the welding flame, and means for automatically varying the volume of the stream of auxiliary oxygen in proportion to the volume of oxygen in the welding flame.

9. In a welding torch, the combination with means for combining a hydrocarbon and an oxygen concentrate within the torch to form a combustible mixture, means for varying the volume of hydrocarbon in the combustible mixture, means for varying the volume of oxygen in the combustible mixture, and a tip removably attached to said torch through which said combustible mixture is ejected from the torch to form a welding flame, of means including an auxiliary passage through said tip for injecting an auxiliary stream of oxygen concentrate into the welding flame, means including a constriction in said auxiliary passage for automatically varying the volume of oxygen in the auxiliary stream in proportion to the volume in the combustible mixture, and means including an enlargement of the outer end of the auxiliary passage for reducing the speed at which the stream of auxiliary oxygen is injected into the welding flame.

10. In a welding torch, the combination with means for combining acetylene and commercially pure oxygen within the torch to form a combustible mixture, means for varying the volume of acetylene in the combustible mixture, means for varying the volume of oxygen in the combustible mixture, and a tip removably attached to the torch through which the combustible mixture is ejected from the torch to form a hollow welding flame, of means including an auxiliary passage through said tip for injecting an auxiliary stream of oxygen into the hollow center of the welding flame, means including a constriction in said auxiliary passage for automatically varying the volume of oxygen in the auxiliary stream in proportion to the volume in the combustible mixture, and means including an enlargement of the outer end of the auxiliary passage for reducing the speed at which the stream of auxiliary oxygen is injected into the welding flame.

11. In a blowpipe, a conduit for a hydrocarbon gas, a main conduit for oxygen concentrate having a branch conduit connected to said conduit for the hydrocarbon gas to form a combustible mixture, means for discharging said mixture from said blowpipe to produce a flame, a second branch conduit leading from said main conduit for oxygen, said second branch conduit being adapted to deliver auxiliary oxygen concentrate to said flame, means for varying the volume of oxygen concentrate delivered to said mixture, and a metering orifice in each of said branch conduits for automatically varying the volume of the stream of auxiliary oxygen in proportion to the volume of oxygen in said flame.

12. Process of producing a heating flame comprising mixing hydrocarbon and oxygen concentrate and producing a flame with such mixture; adding an auxiliary stream of oxygen concentrate to the inner portion only of said flame; and automatically controlling the volume of said stream of auxiliary oxygen.

13. A blowpipe tip having combustible mixture passages and an oxygen passage extending therethrough, said oxygen passage having a constriction and a single unitary enlargement adapted to reduce the velocity of the oxygen and to conduct the latter from said constriction to the outlet orifice of the oxygen passage.

14. A blowpipe tip having an oxygen passage extending therethrough comprising a single undivided portion which gradually diverges to the outlet orifice of said passage.

15. A blowpipe tip having an oxygen passage extending therethrough, said passage comprising a constriction and a single undivided portion which diverges to the outlet orifice of said passage.

16. A blowpipe tip having an undivided oxygen passage therethrough, such passage having a constriction intermediate its ends and being enlarged from said constriction to the outlet orifice of said passage.

17. A blowpipe tip having heating gas passages and an oxygen passage, said oxygen passage having a constriction and a unitary enlargement from said constriction to the outlet orifice of said oxygen passage, such enlargement comprising a portion tapering divergently to said orifice.

18. A blowpipe tip having combustible mixture passages and an oxygen passage extending therethrough, said oxygen passage comprising a constriction and a single undivided portion which gradually diverges to the outlet orifice of said passage so as to effect a reduction in velocity of the oxygen flowing through said passage.

ROBERT L. WAGNER.